United States Patent Office 2,834,664
Patented May 13, 1958

2,834,664

GASOLINE FUELS

Glenn Irish, Detroit, and James B. Hinkamp and Daniel A. Hirschler, Jr., Birmingham, Mich., assignors to Ethyl Corporation, New York, N. Y., a corporation of Delaware No Drawing. Application May 28, 1953
Serial No. 358,214

11 Claims. (Cl. 44—62)

The present invention relates to improved fuel for internal combustion engines and, more particularly, to a class of motor fuel adjuvants which improve substantially the performance qualities of liquid hydrocarbon fuel.

In recent years there has been a marked trend in the automotive industry of utilizing internal combustion engines having high compression ratios in passenger cars and trucks. It has been found that this increase in compression ratios results in increased engine efficiency whereby the motoring public is provided with both greater power availability and greater economy of operation. High compression engines almost uniformly require fuels of high octane number for most efficient operation. Of the several methods of raising the octane number of gasoline developed to date, that of utilizing an antiknock agent, particularly of the organolead type, has been most successful. Although such antiknock agents have been provided with corrective agents commonly known as scavengers, which effectively reduce the amount of metallic deposits in the engine by forming volatile metallic compounds which emanate from the engine in the exhaust gas stream the accumulation of engine deposits in combustion chambers and on other engine parts such as pistons, valves, and the like cannot be entirely prevented. This accumulation of deposits is particularly prevalent when the vehicles are operated under conditions of low speed and light load as encountered in metropolitan localities. As a result of the notable improvements in fuel antiknock quality, which have been made in recent years, such deposits present but a few minor problems in low compression engines, whereas with engines of higher compression ratios two more serious problems are becoming increasingly prevalent, those of detonation and deposit-induced autoignition or wild ping. Although detonation can successfully be obviated by the utilization of organolead antiknock agents such as tetraethyllead, it has been found that the severity of the wild ping problem often increases with the octane quality of the fuel. Hence the automotive industry is faced with the dilemma resulting from the fact that each time the octane quality of the fuel is raised to coincide with increases in compression ratio, deposit-induced autoignition generally becomes more severe.

Ordinary detonation in the internal combustion engine has been defined as the spontaneous combustion of an appreciable portion of the charge, which results in an extremely rapid local pressure rise and produces a sharp metallic knock. The control of ordinary detonation may be effected by retarding ignition timing, by operating under part throttle conditions, by reducing the compression ratio of the engine, and by using fuels having high anti-knock qualities, that is, by using an organolead-containing fuel. Deposit-induced autoignition may be defined as the erratic ignition of the combustible charge by combustion chamber deposits resulting in uncontrolled combustion and isolated bursts of audible and inaudible manifestations of combustion, somewhat similar to knocking. Aside from the nuisance experienced by the passenger car operator, deposit-induced autoignition or wild ping often produces deleterious effects inasmuch as it is a precursor of preignition. Therefore, wild ping results in rough engine operating conditions and very often increases the wear of engine parts, piston burning and the like. In contrast to ordinary detonation, deposit-induced autoignition or wild ping cannot be satisfactorily controlled by retarding ignition timing nor by operating under part throttle conditions. Inasmuch as automotive engineers are desirous of utilizing in internal combustion engines the highest compression ratios permitted by the commercially available fuels, the reduction of compression ratios to eliminate this problem is not desirable nor feasible. Indeed, it is the consensus of opinion among the designers of internal combustion engines that engine developments have heretofore been greatly hindered by the limitations imposed by deposit-induced autoignition. It is evident, therefore, that the present requirement for fuel having high antiknock qualities shall be greatly surpassed by future requirements. Notwithstanding attempts to attain these qualities by alternative means, it is entirely probable that the most satisfactory method for the attainment of high octane fuels shall continue to be the use of antiknock agents, particularly of the organolead type. As a result, there is a paramount need existing for a new and improved method for altering the physical and chemical characteristics of deposits and for modifying the combustion process such that the detrimental effects of deposit-induced autoignition may be markedly suppressed or be eliminated.

Accordingly, it is an object of this invention to provide adjuvants for leaded internal combustion engine fuel. Likewise, it is an object of our invention to provide an improved composition adapted for use as fuel for internal combustion engines which, when subjected to the combustion process, will result in the obviation of deposit-induced autoignition. Another object of the present invention is to provide improved fluids adapted for blending with internal combustion engine fuel which concurrently prevent detonation or knocking and obviate the deleterious effects of deposit-induced autoignition. Similarly, another object is to provide processes for improving the characteristics of internal combustion engine fuel. Likewise, an object of this invention is to provide processes of operating an internal combustion engine which result in the suppression or minimization of wild ping. Additional important objects of this invention will become apparent from the discussion which follows.

We have now found that the above and other objects of this invention can be accomplished by providing as adjuvants for leaded internal combustion engine fuel organic strontium material. Likewise, a preferred embodiment of the present invention consists of providing improved compositions comprising organolead material and an organic strontium material. Our invention involves a number of important and practical embodiments which will be considered in detail hereinafter.

In accordance with our invention we provide as adjuvants for leaded fuel for internal combustion engines a class of materials known in the art as organic strontium materials. As used hereinafter the term organic strontium material denotes organic strontium containing organic compounds, that is, compounds wherein strontium is bonded indirectly to the carbon residue or organic portion of the compound through a linking element. Such compounds are generally stable in common environments against the deleterious effects of atmospheric constituents, water, and the like because they are free from carbon-to-strontium bonds. In general, we prefer essentially sulfur-free strontium material in accomplishing the objects of this invention and in particular we prefer compounds characterized by the presence of strontium-to-oxygen bonds which can be ionic, coordinate or coordinate covalent bonds.

It will be apparent from the foregoing discussion that a preferred embodiment of this invention consists of providing improved compositions comprising organolead-containing material and strontium compounds formed with a member selected from the class consisting of chelating agents and organic compounds containing a replaceable hydrogen in an hydroxyl group. Therefore, the organic strontium material utilized in accordance with the present invention is preferably a strontium compound formed with a material selected from the group consisting of organic acids, phenols, alcohols and chelates.

As indicated the organic strontium material we employ in the organolead-containing compositions of the present invention can exist in a number of chemical forms. By way of example in one embodiment of our invention we employ strontium salts of organic acids. Such acids can conveniently be considered as consisting of seven general types. Thus, the strontium salts of organic acids we employ in the organolead-containing compositions of the instant invention can be salts of saturated monobasic aliphatic carboxylic acids, monobasic unsaturated aliphatic carboxylic acids, dibasic aliphatic acids, polybasic aliphatic acids, aromatic carboxylic acids, naphthenic acids, and rosin acids.

When we employ as our organic strontium material salts or soaps of saturated monobasic aliphatic carboxylic acids in accordance with this invention, we utilize the strontium derivatives of such acids as caproic, oenanthic, caprylic, pelargonic, capric, undecylic, lauric, tridecylic, myristic, pentadecylic, palmitic, margaric, stearic, nonadecylic, arachidic, eicosanecarboxylic, behenic, lignoceric, cerotic, melissic, psyllastearic, and the like. In general, when employing such strontium salts or soaps, we prefer those derived from acids containing from about 10 to about 30 carbon atoms in the molecule since such compounds possess the desired solubility and inductibility characteristics, important criteria of the materials of the present invention.

Another class of strontium derivatives of organic acids we employ in accordance with the present invention is the strontium salts of monobasic unsaturated aliphatic carboxylic acids. Thus, we employ the strontium compounds of such acids as erucic, oleic, citronellic, undecylenic, elaidic, ricinoleic, brassidic, nervonic, geranic, linoleic, α-, and β-elaeostearic, linolenic, dehydrogeranic, stearolic, and like acids.

When we employ organic strontium materials derived from dibasic aliphatic acids in the organolead-containing compositions of the present invention we utilize the strontium compounds formed from such acids as suberic acid, azelaic acid, sebacic acid, nonane-dicarboxylic acid, decane-dicarboxylic acid, undecane-dicarboxylic acid, eicosane-dicarboxylic acid, phloionic acid, and like acids.

The polybasic aliphatic acids which form strontium derivatives suitable for use in accordance with the present invention are exemplified by ethanetetracarboxylic acid, and the dialkyl and diaryl acid esters thereof. For example, we can utilize the strontium compound formed from ethanetetracarboxylic acid per se and likewise we can utilize the strontium derivatives of the diethyl ester of ethanetetracarboxylic acid. Similarly, we can use the strontium compound derived from the diphenyl ester of ethanetetracarboxylic acid. Likewise, the aryl ester can be further substituted with alkyl groups so as to obtain the necessary balance of solubility and engine inductibility.

Another type of organic strontium material which can be used in the organolead-containing compositions of the present invention is the strontium salts of aromatic carboxylic acids. Such acids are exemplified by alkyl substituted benzoic acid, such as methyl benzoic acid, propyl benzoic acid, dimethyl benzoic acid, etc.; phenyl acetic acid, hydratropic acid, cinnamic acid, atropic acid, phthalic acid and alkyl substituted phthalic acids such as ethyl phthalic acid, butyl phthalic acid, diethyl phthalic acid, etc.; naphthalic acid and alkyl substituted naphthalic acids such as amyl naphthalic acid, octyl naphthalic acid, dihexyl naphthalic acid, the alkyl substituents being present in either of the aromatic rings or both; mellitic acids as, for example, the strontium salt of mono alkyl esters of hemimellitic acid; and analogous acids.

Another class of organic strontium material utilized in accordance with the present invention consists of the strontium derivatives of naphthenic acids and other complex acid mixtures found in crude petroleum mineral oils. Strontium naphthenate serves as an example of such substances.

The strontium salts derived from rosin acids exemplify another class of organic strontium material which can be utilized in organolead-containing compositions in accordance with the present invention. Rosin acids are complex acids derived from tall oil and pitch such as pine resin and the like; a common example of such acids being abietic acid.

Most of the strontium salts derived from the above classes of acid substances are readily soluble in gasoline and in the constituents of antiknock fluids such as organolead compounds, organic bromine and/or chlorine scavengers and the like. By the same token, such strontium compounds in general possess the characteristic of being readily inductible into the engine. Because of this it is generally unnecessary to utilize any of the common solubilizing agents such as coal tar fractions, petroleum cuts and the like although in some instances some additional benefits are to be derived by so doing.

Another embodiment of the present invention consists of utilizing in organolead-containing materials strontium phenolates and closely related strontium compounds. Such strontium compounds can conveniently be considered as derivatives of monohydric phenols or of polyhydric phenols. In the former group we prefer to utilize such phenols as the diverse monohydroxy substituted benzenes, naphthalenes, hydronaphthalenes and the like as well as suitable substituted derivatives thereof. However, in general, we prefer to utilize the strontium compounds formed by replacement of the hydrogen atom in the phenol group wherein the aromatic nucleus is substituted with alkyl side chains. Thus, we utilize the strontium derivatives of such phenols as ortho, meta, and paracresols, xylols such as 1,2-dimethyl-3-hydroxy benzene, 1,2-dimethyl-4-hydroxy benzene, 1,3-dimethyl-2-hydroxy benzene, 1,3-dimethyl-4-hydroxy benzene, 1,3-dimethyl-5-hydroxy benzene, 1,4-dimethyl-2-hydroxy benzene, thymol, carvacrol, mesitol, and the like. The latter class of strontium phenolates we can utilize in accordance with this invention, that is, the strontium polyhydric phenolates, is illustrated by the strontium compounds derived from pyrocatechol and related polyhydric phenols wherein the aromatic nucleus is substituted with alkyl radicals such as methyl, ethyl, propyl, butyl, amyl, hexyl, octyl, decyl, and similar straight and branched chain alkyl radicals; and resorcinol including the analogous phenols wherein the aromatic nucleus is likewise substituted with alkyl radicals as previously indicated. Although the corresponding monohydric and polyhydric thiophenols, that is, aromatic compounds wherein the aryl nucleus is substituted with at least one sulfhydryl group, from fuel soluble strontium derivatives these are not preferred for utilization in accordance with the present invention because of the property of the sulfur contained therein of enhancing the destructiveness of organolead antiknock agents such as tetraethyllead. In addition to this, the use of sulfur-containing strontium materials in accordance with this invention is to be avoided because of other deleterious effects upon the combustion process attributable to the presence of sulfur in the fuel charge.

Another embodiment of this invention consists of utilizing as organic strontium material strontium alcoholates, that is, strontium compounds formed by the replacement of hydrogen in the hydroxyl groups of alcohols. When employing strontium alcoholates we prefer strontium compounds derived from alcohols containing from about 10 to about 30 carbon atoms in the molecule. Thus, we prefer to employ the strontium alcoholates derived from such alcohols as the straight and branched chain forms of decyl, undecyl, dodecyl, cetyl, ceryl, octacosanol, triacontanol, and likewise, the strontium alcoholates derived from the diverse polyhydric alcohols containing from about 10 to about 30 carbon atoms in the molecule.

Another embodiment of the present invention is to utilize in combination with organolead-containing material strontium chelates, that is, strontium containing compounds formed with substances possessing a molecular structure in which a ring can be formed by the residual valencies or unshared electrons of neighboring atoms. Hence, the strontium chelates we employ in accordance with our invention are preferably the strontium compounds formed with bidentate chelating agents which comprise one acidic group and one coordinating group. More specifically, the chelating agents we utilize in the formation of the organic strontium material used in accordance with this invention comprise 1,3-diketones, aromatic o-hydroxy aldehydes, o-hydroxy phenones, and the like. Thus, for example we utilize the strontium chelates derived from such 1,3-diketones as acetylacetone; benzoyl acetone; acetoacetic esters such as methyl acetoacetate, ethyl acetoacetate, propyl acetoacetate, isopropyl acetoacetate, butyl acetoacetate, including the several positional isomers of the butyl radical, octyl acetoacetate including the various positional isomers of the octyl radical, benzyl acetoacetate, and the like, benzoyl pyruvic acid, diesters of malonic acid and alkyl and aryl substituted malonic acid, tetraesters of ethanetetracarboxylic acid, etc. Strontium chelates derived from aromatic o-hydroxy aldehydes are illustrated by the strontium chelates formed with salicyl aldehyde, and like materials. Para-methoxy o-hydroxy acetophenone and similar materials serve as illustrations of o-hydroxy acetophenones which likewise form chelates with strontium and which can be utilized in accordance with the present invention.

The employment of the organic strontium material in organolead-containing material in accordance with the present invention is susceptible of variation. In one embodiment of this invention we blend an organic strontium compound of the character described hereinbefore with a liquid hydrocarbon fuel which has previously been treated in the normal fashion with a conventional amount of an organolead antiknock agent or organolead-containing antiknock fluid. The resulting homogeneous improved fuel composition can then be introduced into an internal combustion engine with the attendant marked suppression or minimization of deposit-induced autoignition. A variant of this procedure encompassed by the present invention comprises blending with a fuel of the gasoline boiling range a suitable quantity of an organic strontium material as described hereinbefore, thereby forming a homogeneous strontium-containing fuel which subsequently can be treated with a typical organolead antiknock composition. A third variant in this procedure consists of concurrently blending both an organolead-containing composition and an organic strontium material with a fuel for spark fired internal combustion engines. Upon stirring, shaking or otherwise agitating the resulting mixture, there is provided an improved fuel composition of the present invention possessing the characteristics of virtually eliminating wild ping. A preferred embodiment of the present invention, however, consists of providing improved antiknock fluids comprising an organolead antiknock agent and an organic strontium material. That is to say, we prefer to provide a composition of matter comprising an organolead antiknock agent such as a lead alkyl and an organic strontium compound formed with a material selected from the class consisting of organic acids, phenols, alcohols and chelates. As indicated previously such a composition can likewise contain the normal halide scavenger complement dependent upon the use for which the fluid is intended. In other words, when the fluid is to be employed in aviation fuel it is preferable to utilize one theory of bromine as ethylene dibromide, one theory of bromine being defined as the amount of bromine theoretically required to react with the lead, which quantity is two atoms of bromine per atom of lead. In contrast, when the fluid is to be employed in fuel for automotive and truck engines, it is efficacious to employ a mixture of bromine and chlorine scavengers such as for example a mixture consisting of 0.5 theory of bromine as ethylene dibromide and 1.0 theory of chlorine as ethylene dichloride. In addition to the halide scavengers the improved antiknock fluids of the present invention, that is, those containing an organic strontium compound formed with a member selected from the class consisting of chelating agents and organic compounds containing a replaceable hydrogen in an hydroxyl group can contain other constituents such as organic dyes for product identification, solubilizing agents and/or protective agents such as metal deactivators, antioxidants, and the like. In this embodiment of our invention the improved antiknock fluid so provided can be blended with fuel of the gasoline boiling range thereby providing an improved fuel composition particularly from the standpoint of deposit-induced antoignition.

The amount of the organic strontium material we employ in the diverse compositions of the present invention is contingent upon, first the nature of the strontium compound employed and second, the nature of the medium or vehicle in which it is to be employed. Generally speaking, however, we have found that deposit-induced autoignition can be minimized significantly by providing compositions containing organic strontium material and organolead compounds such that the strontium-to-lead atom ratio is between about 0.001 to 1 and about 1.5 to 1. However, in general we prefer to employ the organic strontium material in an amount such that the strontium-to-lead atom ratio is between about 0.02 to 1 and about 1 to 1, with the best overall results being obtained with a ratio between about 0.03 to 1 and about 0.5 to 1. Thus, when employing tetraethyllead-containing improved antiknock fluids of the present invention in fuel for internal combustion engines we blend therewith an amount equivalent to from between about 0.5 and about 6.0 milliliters of tetarethyllead per gallon. Generally speaking when we employ other organolead-containing improved antiknock fluids of the present invention, that is, fluids comprising organic strontium material and organolead antiknock agents such as tetraphenyllead and lead alkyls exemplified by tetramethyllead, tetrapropyl lead, tetrabutyl lead, dimethyldiethyl lead, and other so called mixed lead alkyls, in fuels for use in automotive engines the amount of such fluid used is up to about 3.17 grams of lead per gallon. When such fluids are to be utilized in fuels for aviation engines the amount of lead blended therewith is up to about 6.34 grams of lead per gallon. Satisfactory results however can generally be obtained with somewhat lesser quantities of organolead antiknock agent in the fuel. Thus, in automotive fuels and in particular, those adapted for use in high compression engines it is usually necessary to utilize at least 2.1 grams of lead per gallon as a strontium-containing antiknock fluid of the present invention. Likewise, fuels for modern aviation engines should contain at least about 4.7 grams of lead per gallon of our improved antiknock fluids.

A feature of this invention is that the above defined strontium-to-lead ratios o fthe organolead-containing compositions of the present invention are critical. That is to say, we find that lesser quantities of strontium in the compositions of the present invention, or in other words, compositions comprising a lower strontium-to-lead ratio than described hereinabove are virtually ineffective with regard to the suppression or elimination of wild ping. As a result of our concerted investigation with regard to the effectiveness of strontium when employed in accordance with the present invention we have developed two theories explaining in at least a tenable manner, this unexpected phenomenon. One explanation is that the important benefits derived from the presence of strontium in the organolead-containing fluids or fuels of the present invention are contingent upon a requisite atmosphere upon combustion. In other words, this wild ping suppressing atmosphere enveloping the normally active deposits necessitates the present of a critical strontium-to-lead atom ratio which apparently prevents the deposits in the combustion chamber from exerting their adverse catalytic activity. Another tenable explanation is that strontium exerts its beneficial influence by modifying the deposits in some currently unexplainable manner. In such a case, it will be apparent that the rate of deposition under present day engine operating conditions necessitates the presence of the above defined strontium-to-lead atom ratio. According to the hypothesis the rates of physical scavenging whereby the deposits are physically broken away from the engine surfaces and chemical scavenging whereby volatile compounds are formed in the presence of halogen scavengers apparently are exceeded by the rate of strontium deposition when our critical ratios are employed without significant changes in the amount of deposits so modified. Either or both of these explanations as to the effectiveness of the compositions of our invention find support in the fact that the addition of lesser quantities of strontium to the fuel directly or by means of the organolead fluid compositions results in no noticeable improvement with regard to wild ping even when the engine is operated for long periods of time.

In contrast with the foregoing, we have found that the addition of organic strontium compounds in amounts in excess of the above defined ratios resulted in a number of other difficulties, particularly during engine operation. For example, excessive amounts of organic strontium compounds tend to increase the volume of deposits in the combustion chamber and on other engine parts such as pinions, valves, spark plugs and the like. This deposition undoubtedly is a contributing factor in the increase in the octane requirement of the engine resulting from the utilization of excessive amounts of strontium-containing material. Similarly, under these circumstances deposits are frequently formed in the intake manifold and occasionally in the carburetor. These probably result from the differences in volatility between the major portion of the fuel and the organic strontium material. However, when such material is utilized in accordance with the instant invention, that is, when the strontium-to-lead atom ratio is maintaining between 0.001 to 1 and 1.5 to 1, both deposit-induced autoignition and detonation are obviated without the attendant difficulties described above, namely, increased deposition and octane requirement of the engine.

As indicated hereinbefore, the organic strontium compounds present in the improved fuels and fluids of this invention are essentially sulfur-free. There are a number of reasons for this feature of our invention, among them the inherent properties of most sulfur-containing compounds of destroying the antiknock effectiveness of organolead antiknock agents, of increasing the amount of engine deposits and their characteristics thereby resulting in increases in octane requirement, and of increasing the tendencies of antiknock fluids and fuels of deteriorating, particularly on storage in contact with metallic containers, thereby enhancing the formation of gums, varnishes, sludge and the like. However, when utilizing organic strontium material in accordance with the present invention, none of these deleterious effects are encountered.

To demonstrate the effectiveness of the improved antiknock fluids and fuels of the present invention in the prevention, control, and minimization of deposit-induced autoignition we subject both hydrocarbon fuel treated in accordance with our invention and another portion of the same hydrocarbon fuel treated with a conventional antiknock mixture to a test procedure involving the use of a single-cylinder CFR knock test engine equipped with an L-head cylinder and a wild ping counter which records the total number of wild pings which have occurred during the test periods. Such apparatus includes an extra spark plug used as an ionization gap which is installed in a second opening in the combustion chamber. Mechanical breaker switch driven at camshaft speed is also provided which, when closed makes the wild ping counter ineffective for the duration of the normal flame in the combustion chamber. The breaker is open for 80 crankshaft degrees between 70° BTC (before top dead center) and 10° ATC (after top dead center). If a flame front induced early in the cycle by deposits reaches the ionization gap during this open period, the counter registers a wild ping regardless of the audible manifestations. During normal combustion with ignition timing at TDC (top dead center), the flame front reaches the ionization gap 15 to 18° ATC during the period wherein the points are closed and no count is made. The actual test procedure consists essentially of operating the test engine initially having a clean combustion chamber under relatively mild cycling conditions for deposit formation until an equilibrium with regard to deposit-induced autoignition is reached. The effect of fuels treated in accordance with the instant invention is determined by comparing the test results obtained using the fuel treated with an organic strontium material with those obtained using a fuel treated with a conventional antiknock mixture. Since the wild ping counter records the total number of wild pings which have occurred during the test procedures a quantitative expression for the amount of deposit-induced autoignition is the number of wild pings per hour of operation.

The effectiveness of our improved fuel compositions in virtually eliminating deposit-induced autoignition will be apparent from the following specific examples.

*Example I*

To 50 gallons of a commercially available blend of straight run, catalytically cracked and polymer blending stocks was added and thoroughly mixed 120 milliliters of tetraethyllead as an antiknock fluid comprising tetrathyllead, 0.5 theory of bromine as ethylene dibromide, and 1.0 theory of chlorine as ethylene dichloride. The resulting homogeneous fuel composition was divided into two equal portions, one of which was used as the fuel in the previously designated single-cylinder laboratory test engine to formulate a base line on wild ping with a conventional fuel. To the other portion of the fuel composition was added an amount of strontium octyl acetoacetate such that the resulting fuel after intimate mixing contained 0.2 parts of strontium per gallon. Stated differently, the improved fuel composition so formed possessed a strontium-to-lead atom ratio of 0.15 to 1. When the same engine was operated on this fuel it was found that there were 15 wild pings per hour of engine operation as contrasted with 98 wild pings per hour with the conventional fuel. Thus, the utilization of an improved fuel composition of the present invention resulted in a reduction of 85 per cent in the rate of wild ping.

*Example II*

An improved antiknock fluid composition of the present invention was prepared by adding strontium octyl acetoacetate to 150 milliliters of tetraethyllead as an antiknock fluid comprising tetraethyllead, 0.5 theory of bromine as ethylene dibromide, and 1.0 theory of chlorine as ethylene dichloride. A homogeneous fluid composition was obtained by intimately mixing the aforementioned components in quantity such that the strontium-to-lead atom ratio was 0.057 to 1. The entire quantity of the improved antiknock fluid composition so prepared was added to 50 gallons of a commercially available blend of straight run, catalytically cracked and polymer blending stocks. Upon mechanically agitating the resulting mixture a homogeneous fuel composition was prepared which contained 0.075 part of strontium per gallon. The laboratory single-cylinder test engine as described hereinbefore was then operated on this improved fuel composition while contemporaneously determining the rate of wild pings as detected by the wild ping counter. It was found that the incorporation in the fuel of an improved antiknock fluid of the present invention resulted in 16 wild pings per hour as contrasted with a conventional lead-containing fuel which produced 98 wild pings per hour. Consequently, the improved fuel composition of the present invention resulted in a reduction of wild ping of 84 percent.

Example III

To 50 gallons of a commercially available blend of straight run, catalytically cracked and polymer blending stocks was added and thoroughly mixed 150 milliliters of tetraethyllead as an antiknock fluid comprising tetraethyllead, 0.5 theory of bromine as ethylene dibromide, and 1.0 theory of chlorine as ethylene dichloride. The resulting homogeneous fuel composition was then treated with strontium octyl acetoacetate, which treatment consisted of blending an amount of strontium compound with the conventional leaded fuel such that a homogeneous fuel composition containing 0.03 part of strontium per gallon resulted. The improved fuel composition so formed was then utilized as the fuel for the test engine, the wild ping counter recording the number of wild pings produced. It was found that operating the engine on this fuel which possessed a strontium-to-lead atom ratio of 0.023 to 1 resulted in 47 wild pings per hour whereas the conventional fuel produced 98 wild pings per hour. Thus, the combustion of an improved fuel composition of the present invention resulted in a reduction of 52 percent in the rate of wild ping.

Example IV

An improved antiknock fluid composition of the present invention was prepared by adding strontium octyl acetoacetate to 150 milliliters of tetraethyllead as an antiknock fluid comprising tetraethyllead, 0.5 theory of bromine as ethylene dibromide, and 1.0 theory of chlorine as ethylene dichloride. A homogeneous fluid composition was obtained by intimately mixing the aforementioned components in quantity such that the strontium-to-lead atom ratio was 0.075 to 1. The entire quantity of the improved antiknock fluid composition so prepared was added to 50 gallons of a commercially available blend of straight run and catalytically and thermally cracked stocks. Upon mechanically agitating the resulting mixture a homogeneous fuel composition was prepared which contained 0.10 part of strontium per gallon. The laboratory single-cylinder test engine as described hereinbefore was then operated on this improved fuel composition while contemporaneously determining the rate of wild pings as detected by the wild ping counter. It was found that the incorporation in the fuel of an improved antiknock fluid of the present invention resulted in 33 wild pings per hour. Another identical amount of the same fuel base stock was treated with 150 milliliters of tetraethyllead as an antiknock fluid comprising tetraethyllead, 0.5 theory of bromine as ethylene dibromide, and 1.0 theory of chlorine as ethylene dichloride. It was found that this fuel composition resulted in 98 wild pings per hour. Consequently, the improved fuel composition of the present invention resulted in a reduction of wild ping of 66 percent.

The preceding specific examples are merely illustrative of the beneficial effects produced by the improved organolead-containing compositions of the present invention. As indicated hereinbefore our invention is susceptible of a number of important embodiments by virtue of its great diversity of application. However, in essence the present invention consists of providing compositions comprising organolead-containing materials and an organic strontium material wherein strontium is bonded indirectly to the carbon residue or organic portion of the compound through a linking element. Thus, as indicated previously the organolead-containing materials which can be treated in accordance with the instant invention include leaded fuel for internal combustion engines, notably leaded aviation and automotive fuel and anti-knock fluids, that is, compositions which generally consist of an organolead antiknock agent in combination with at least one halide scavenging material. In the latter embodiment of the present invention advantages are sometimes to be derived from cutting back the amount of such halide scavenger whereas in other instances the utilization of somewhat greater amounts of scavenging material than those conventionally used is efficacious. By the same token the halide scavengers so used are generally ethylene dibromide and/or ethylene dichloride although it is to be understood that the improved fluid and fuel compositions of the present invention can contain other scavengers such as, for example, those disclosed in U. S. 1,592,954; 1,668,022; 2,364,921; 2,398,281; 2,479,900; 2,479,901; 2,479,902; 2,479,903; and 2,496,983. Likewise, the essentially sulfur-free organic strontium material can be used in organolead-containing compositions in conjunction with other wellknown motor fuel adjuvants such as antioxidants, organolead stabilizers, organic dyes, solubilizers, and indeed with other organometallic materials frequently employed in fuel. Another variant inherent in the present invention which is frequently of economic significance is the fact that we can employ mixtures of diverse organic strontium materials of the character described hereinbefore. This will become apparent by virtue of the relatively large number of mixtures of organic compounds containing replaceable hydrogen atoms in hydroxyl groups which are readily available as articles of commerce.

To further illustrate the beneficial effects provided by the compositions of the present invention upon wild ping, we find that this phenomenon is markedly reduced or virtually eliminated by utilizing in a strontium-to-lead atom ratio between about 0.001 to 1 and 1.5 to 1 such mixtures as strontium caproate and tetraethyllead, strontium pelargonate in combination with tetraphenyllead, strontium margarate with tetraethyllead, strontium laurate in combination with tetrapropyllead, strontium cerotate with tetrabutyllead, strontium undecylenate in combination with tetraphenyllead, strontium elaidate with tetrabutyllead, strontium ricinoleate with tetraethyllead, strontium geranate in combination with tetraethyllead, strontium brassidate with tetramethyllead, strontium sebacate in combination with tetraphenyllead, strontium suberate with tetrathyllead, strontium azelate with tetrabutyllead, strontium ethanetetracarboxylate in combination with tetraethyllead, the strontium salt formed from the diethyl ester of ethanetetracarboxylic acid and tetraphenyllead, strontium methyl benzoate in combination with tetraethyllead, strontium cinnamate in combination with tetrabutyllead, strontium dimethyl benzoate and tetramethyllead, strontium atropate with tetrapropyllead, strontium naphthenate in combination with tetraethyllead, strontium rosin acid derivative and tetraphenyllead, strontium abietate with tetraethyllead, strontium phenolate formed with o-cresol and tetraethyllead, strontium phenolate formed with 1,2-dimethyl-3-hydroxy benzene and tetraphenyllead, strontium phenolate formed with carvacrol and tetraethyllead, strontium alcoholate derived from decyl alcohol in combination with tetraphenyllead, strontium alcoholate derived from cetyl alcohol with tetrabutyllead, strontium alcoholate derived from ceryl alcohol with tetrabutyllead, strontium alcoholate derived from undecyl alcohol in combination with tetraethyllead, strontium chelate formed with acetylacetone and tetraethyllead, strontium chelate formed with benzoyl acetone in combination with tetrabutyllead, strontium chelate formed with hexyl acetoacetate and tetraethyllead, and the like.

Having fully described the nature of the present invention, the need therefor, and the best modes devised for carrying it out, we do not intend that our invention be limited except within the spirit and scope of the appended claims.

We claim:
1. Gasoline containing an antiknock quantity of a hydrocarbon lead antiknock agent, said quantity being up to about 6.34 grams of lead per gallon of said gasoline, and a gasoline-soluble, sulfur-free organic strontium compound containing only the elements strontium, carbon, hydrogen and oxygen, the strontium being bonded to the organic portion of the molecule through oxygen, said compound being selected from the group consisting of (A) strontium salts of (1) saturated monobasic hydrocarboaliphatic carboxylic acids, (2) monobasic unsaturated aliphatic carboxylic acids, (3) dibasic aliphatic acids, (4) polybasic aliphatic acids, (5) aromatic carboxylic acids, (6) naphthenic acids, (7) rosin acids, (8) monohydric phenols, (9) polyhydric phenols; said acids and said phenols containing up to about 30 carbon atoms in the molecule; (B) strontium alcoholates made from alcohols containing from about 10 to about 30 carbon atoms in the molecule, and (C) strontium chelates made from bidentate chelating agents which contain one acidic group and one coordinating group and which contain up to about 20 carbon atoms in the molecule; said compound being present in amount such that the strontium-to-lead atom ratio is between about 0.001 to 1 and about 1.5 to 1.

2. The gasoline composition of claim 1 wherein said strontium-to-lead atom ratio is between about 0.02 to 1 and about 1 to 1.

3. The gasoline composition of claim 1 wherein said strontium-to-lead atom ratio is between about 0.03 to 1 and about 0.5 to 1.

4. Gasoline containing an antiknock quantity of tetraethyllead, said quantity being from between about 2.1 and about 6.3 grams of lead per gallon of said gasoline, about 0.5 theory of bromine as ethylene dibromide, about 1.0 theory of chlorine as ethylene dichloride, and strontium naphthenate present in amount such that the strontium-to-lead atom ratio is between about 0.03 to 1 and about 0.5 to 1.

5. Gasoline containing an antiknock quantity of tetraethyllead, said quantity being from between about 2.1 and about 6.3 grams of lead per gallon of said gasoline, about 0.5 theory of bromine as ethylene dibromide, about 1.0 theory of chlorine as ethylene dichloride, and strontium octyl acetoacetate present in amount such that the strontium-to-lead atom ratio is between about 0.03 to 1 and about 0.5 to 1.

6. An antiknock composition adapted for use as an additive for gasoline consisting essentially of a hydrocarbon lead antiknock agent and a gasoline-soluble, sulfur-free organic strontium compound as defined in claim 1, said compound being present in amount such that the strontium-to-lead atom ratio is between about 0.001 to 1 and about 1.5 to 1.

7. An antiknock composition adapted for use as an additive for gasoline consisting essentially of tetraethyllead, organic halide scavenger in amount sufficient to effectively reduce the amount of deposit formed in the engine, and a gasoline-soluble, sulfur-free organic strontium compound as defined in claim 1, said compound being present in amount such that the strontium-to-lead atom ratio is between about 0.03 to 1 and about 0.5 to 1.

8. Gasoline containing an antiknock quantity of tetraethyllead, said quantity being up to about 6.34 grams of lead per gallon of said gasoline, organic halide scavenger in amount sufficient to effectively reduce the amount of deposits formed in the engine, and a gasoline-soluble, sulfur-free organic strontium compound as defined in claim 1, said compound being present in amount such that the strontium-to-lead atom ratio is between about 0.03 to 1 and about 0.5 to 1.

9. Gasoline containing an antiknock quantity of tetraethyllead, said quantity being from between about 2.1 and about 6.3 grams of lead per gallon of said gasoline, about 0.5 theory of bromine as ethylene dibromide, about 1.0 theory of chlorine as ethylene dichloride, and a gasoline-soluble, sulfur-free organic strontium compound as defined in claim 1, said compound being present in amount such that the strontium-to-lead atom ratio is between about 0.03 to 1 and about 0.5 to 1.

10. The composition of claim 6 wherein said strontium-to-lead atom ratio is between about 0.02 to 1 and about 1 to 1.

11. The composition of claim 6 wherein said strontium-to-lead atom ratio is between about 0.03 to 1 and about 0.5 to 1.

References Cited in the file of this patent

UNITED STATES PATENTS

| 1,916,735 | MacLean et al. | July 4, 1933 |
| 2,151,432 | Lyons et al. | Mar. 21, 1939 |

FOREIGN PATENTS

| 525,890 | Great Britain | Sept. 6, 1940 |
| 513,838 | Belgium | Sept. 15, 1952 |